(12) United States Patent
Kyte et al.

(10) Patent No.: US 10,146,662 B2
(45) Date of Patent: *Dec. 4, 2018

(54) RECORDING GUI DATA (71) Applicant: International Business Machines Corporation, Armonk, NY (US)

(72) Inventors: Adrian P. Kyte, Broadstone (GB); Joseph R. Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/272,958

(22) Filed: Sep. 22, 2016

(65) Prior Publication Data
US 2017/0010953 A1 Jan. 12, 2017

Related U.S. Application Data (63) Continuation of application No. 14/486,548, filed on Sep. 15, 2014, now Pat. No. 9,542,297.

(30) Foreign Application Priority Data

Dec. 17, 2013 (GB) .................................. 1322305.2

(51) Int. Cl.
G06F 11/34 (2006.01)
G06F 11/36 (2006.01)

(52) U.S. Cl.
CPC ...... *G06F 11/3636* (2013.01); *G06F 11/3438* (2013.01); *G06F 11/3461* (2013.01); *G06F 11/36* (2013.01); *G06F 11/366* (2013.01); *G06F 11/3476* (2013.01); *G06F 2201/865* (2013.01)

(58) Field of Classification Search
CPC .................................................... G06F 11/3461
USPC ........................................................ 715/806
See application file for complete search history.

(56) References Cited

U.S. PATENT DOCUMENTS

| | | | | |
|---|---|---|---|---|
| 6,968,509 B1* | 11/2005 | Chang | ................. | G06F 9/45512 714/E11.207 |
| 7,627,821 B2* | 12/2009 | Klementiev | ........ | G06F 9/45512 715/704 |
| 8,332,765 B2* | 12/2012 | Ergan | ................. | G06F 3/04895 715/764 |
| 9,092,464 B2 | 7/2015 | Carlson et al. | | |
| 9,390,108 B2 | 7/2016 | Carlson et al. | | |
| 9,542,297 B2 | 1/2017 | Kyte et al. | | |
| 2008/0120129 A1* | 5/2008 | Seubert | ................. | G06Q 10/06 705/35 |
| 2009/0089252 A1* | 4/2009 | Galitsky | ........... | G06F 17/30637 |

(Continued)

FOREIGN PATENT DOCUMENTS

WO 2007118096 10/2007

OTHER PUBLICATIONS

Search report for Application GB1322305.2, Intellectual Property Office, dated Jun. 3, 2014, 3 pages.

(Continued)

*Primary Examiner* — Reza Nabi
(74) *Attorney, Agent, or Firm* — Van Leeuwen & VanLeeuwen; Joseph Petrokaitis (57) ABSTRACT

A system for recording the interaction of a computer program via graphical user interface (GUI) is disclosed in which one or more operating system event queues are monitored and GUI interaction data logged.

21 Claims, 6 Drawing Sheets

(56) References Cited

U.S. PATENT DOCUMENTS

| | | | | |
|---|---|---|---|---|
| 2010/0223499 | A1* | 9/2010 | Panigrahy | G06F 11/0709 714/19 |
| 2010/0229112 | A1* | 9/2010 | Ergan | G06F 3/04895 715/764 |
| 2012/0317549 | A1* | 12/2012 | Cunningham | G06F 11/3612 717/128 |
| 2013/0095864 | A1* | 4/2013 | Marovets | H04W 4/14 455/466 |
| 2015/0020080 | A1* | 1/2015 | Simsek | G06F 9/546 719/314 |
| 2015/0067135 | A1* | 3/2015 | Wang | H04L 67/1002 709/223 |
| 2015/0094039 | A1* | 4/2015 | Jung | H04M 3/42102 455/414.1 |
| 2015/0094045 | A1* | 4/2015 | Jung | H04W 4/16 455/415 |
| 2015/0094046 | A1* | 4/2015 | Jung | H04W 36/0022 455/415 |
| 2015/0095477 | A1* | 4/2015 | Jung | H04M 1/57 709/223 |
| 2015/0169158 | A1* | 6/2015 | Kyte | G06F 11/36 715/806 |
| 2018/0025157 | A1* | 1/2018 | Titonis | G06F 21/56 |

OTHER PUBLICATIONS

Notice of Allowance for U.S. Appl. No. 14/486,548, U.S. Patent and Trademark Office, dated Sep. 12, 2016, 20 pages.
"List of IBM Patents or Patent Applications Treated as Related," Letter from Leslie A. Van Leeuwen, Jun. 14, 2018, 1 page.

* cited by examiner

RECORDING GUI DATA

BACKGROUND OF THE INVENTION

The present invention relates to a system for recording graphical user interface (GUI) data.

Computer systems commonly run software such as application or system software which enable interaction with a user via one or more graphical user interfaces (GUIs). When a problem occurs with such software, the resolution of the problem is generally more efficient if the resolver can observe the user's interactions with the GUI relevant to occurrence of the problem. The GUI windows and user interactions for a program that form the context of an issue may be useful or essential for resolving that issue.

One solution for providing such contextual GUI information includes the user re-creating the problem and capturing the GUI state by taking screen shots, which are then used for the diagnosis process. However this is a time consuming process, which may not result in the relevant data being captured. Another solution includes recording a video of the GUI context for the problem. However, video recordings require additional equipment and commonly result in large video files that may be difficult to communicate over a network. Furthermore, both screen shots and videos of GUI may result in the inadvertent provision of confidential or sensitive data.

SUMMARY

One aspect of the invention provides apparatus for recording graphical user interface (GUI) data for a computer program, the apparatus including one or more processors arranged to: monitor an event queue associated with a GUI for a program, identify a first message on the event queue defining a window of the GUI for the program, log data representing the window in a log associated with the program, identify further messages on the event queue defining one or more updates to the window, identify the net change to the window defined in the further messages, and log data representing the identified net change to the window in the log.

Embodiments of the invention provide accurate reconstruction at a predetermined resolution of GUI interactions. This aids swift understanding for an observer of the relevant GUI interactions to enable, for example, the swifter diagnosis of a user's problem. The GUI simulation is easily understood as it mimics the real GUI interaction. The GUI interaction data is collected automatically without user interaction required for its collection. The GUI log data may be collected in real-time so there is no need for a user to reconstruct a given issue. There is no need for the program being monitored to be instrumented, have code added, or be rewritten. The GUI log file is relatively compact for efficient communication or storage.

The data representing the window may include a serialization of the window. The data representing the net change to the window may include a serialization of the changes to the window. The data representing the window or the net change to the window may be derived from the respective identified message(s) on the event queue. One or more messages on the event queue may define user input to the window of the GUI for the program. The logging of the data associated with the or each further message identified on the event queue may be triggered in accordance with a predetermined logging period. The logging period may be determined by time or message data content or message data quantity. One or more predetermined sets of data may be omitted from or redacted in the log. The logged data may include XML. The event queue may include an operating system (OS) event queue or application program event queue.

The apparatus may be further operable to identify a log file for a selected application program, and display the recorded GUI activity from the log file entries as a simulation of the application program GUI.

Another aspect of the invention provides a method for recording graphical user interface (GUI) data for a computer program, the method including monitoring an event queue associated with a GUI for a program, identifying a first message on the event queue defining a window of the GUI for the program, logging data representing the window in a log associated with the program, identifying further messages on the event queue defining one or more updates to the window, identifying the net change to the window defined in the further messages, and logging data representing the identified net change to the window in the log.

A further aspect of the invention provides a computer program product for recording GUI data for a computer program, the computer program product including a computer-readable storage medium having computer-readable program code embodied therewith, the computer-readable program code configured to: monitor an event queue associated with a GUI for a program, identify a first message on the event queue defining a window of the GUI for the program, log data representing the window in a log associated with the program, identify further messages on the event queue defining one or more updates to the window, identify the net change to the window defined in the further messages, and log data representing the identified net change to the window in the log.

BRIEF DESCRIPTION OF THE DRAWINGS

Embodiments of the invention will now be described, by way of example only, with reference to the following drawings in which.

DETAILED DESCRIPTION

Figure 1:
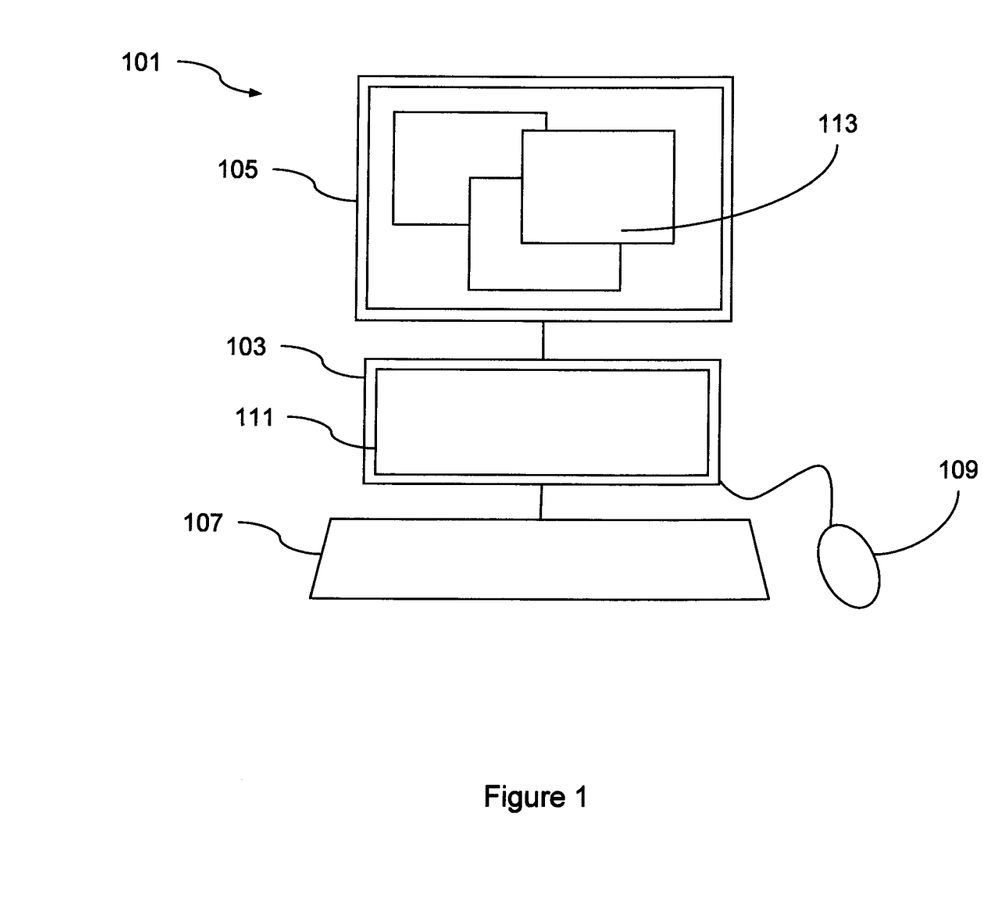
FIG. 1 is a schematic representation of a computer system including a computer, display, keyboard and mouse.

With reference to FIG. 1, a computer system 101 includes a computer 103 with a connected display 105, keyboard 107 and mouse 109. The computer 103 is running an operating system (OS) 111 arranged to provide a window-based graphical user interface (GUI) 113 via the display 105. The keyboard 107 and mouse 109 enable a user to interact with the OS 111 and one or more application programs (not shown) by entering or modifying data and controlling elements of the GUI 113. Such interaction may result in changes to the GUI 113 in terms of the displayed window or data.

Figure 2:
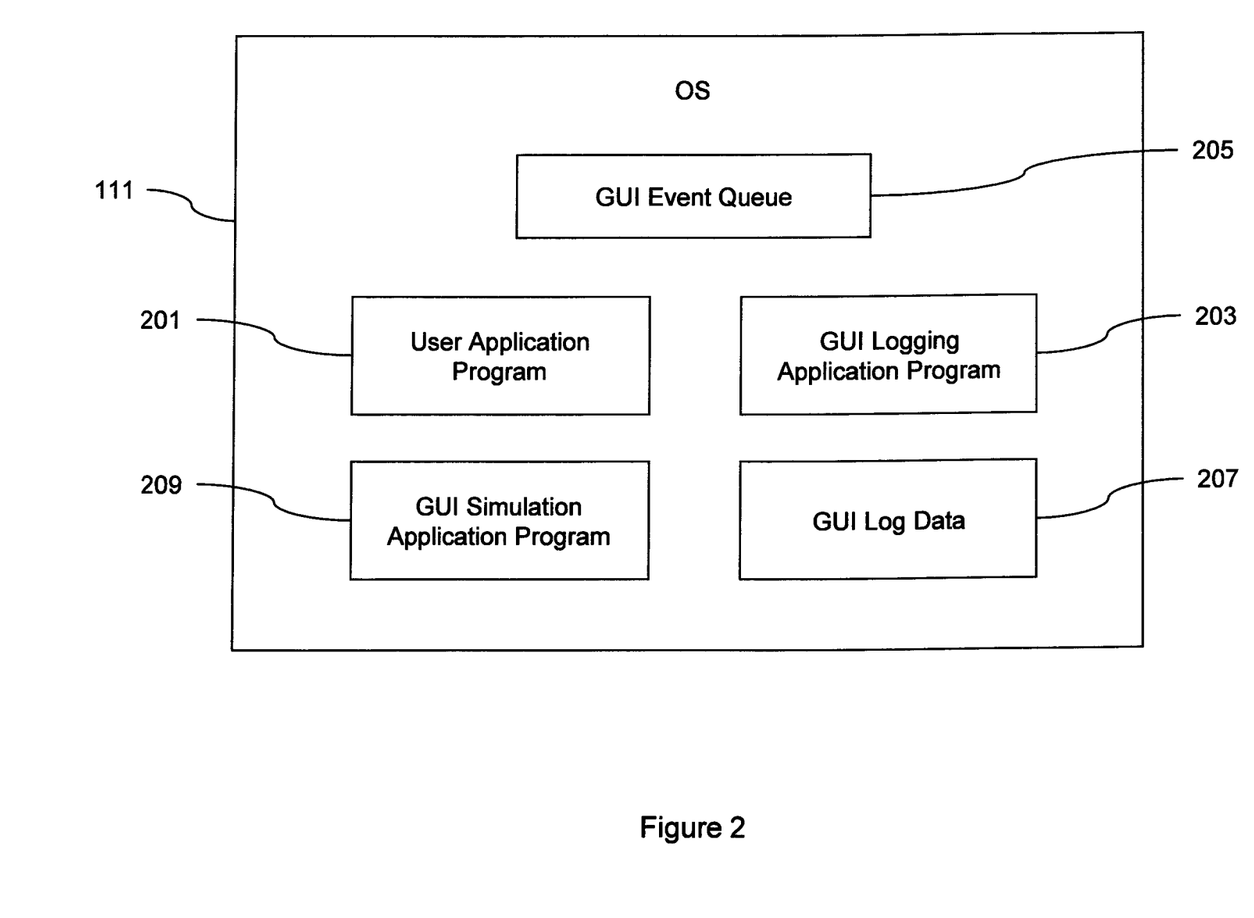
FIG. 2 is a schematic representation of software running on the computer of FIG. 1 including a GUI logging application program and a GUI simulation application program.

With reference to FIG. 2, the computer 103 is running a user application program 201 and a GUI logging application program 203. The user application program 201 is arranged to enable interaction with a user via the GUI 113 to enable the opening and control of GUI windows 113 and the input and modification of data via the user application program 201 in response to user inputs via the keyboard 107 and mouse 109. In one embodiment, the OS 111 has a message-based event-driven architecture and includes a GUI event queue 205. The GUI event queue 205 is provided by the OS 111 and arranged for managing communications between the user and OS 111 via the GUI 113 on one side and the user application program 201 on the other side. Communications are message based with relevant messages being put on the GUI event queue 205 by a sender and read from the GUI event queue 205 by the intended receiver. Examples of messages types and their relevant data placed on the GUI event queue 205 are as follows:

Open window: size, color, layout, buttons, fields, and data;
Modify window: resize, add/remove/modify display data;
Close window;
Keyboard input; and
Mouse input.

The GUI logging application program 203 is arranged to listen to or monitor the GUI event queue 205 for messages related to a selected application program such as the user application program 201. In response to messages put on the GUI event queue 205 to or from the user application program 201, the GUI logging application program 203 is arranged to record data representing those messages in a GUI log data file 207. Where a given message represents a new window, the GUI logging application program 203 is arranged to store data representing that new window in a corresponding entry in the GUI log data file 207. In one embodiment, the data stored in the GUI log data file 207 includes a serialization of the new window message. Where a group of one or subsequent messages identified on the GUI event queue 205 represent modifications, updates or user input to an existing window, the GUI logging application program 203 is arranged to determine the net change in the window represented by the subsequent messages. The GUI logging application program 203 is then arranged to save data representing the net change to the window for a predetermined logging period. In one embodiment, the logging period is time based and includes a five second period. In other words, the messages modifying an existing GUI window that are identified on the GUI event queue 205 within a given logging period are compressed, as noted above, by identifying the net change in the relevant window that those messages represent. The data representing the net change or delta is then stored in a corresponding entry in the GUI log data file 207 in association with an indication of the relevant logging period.

Figure 3:
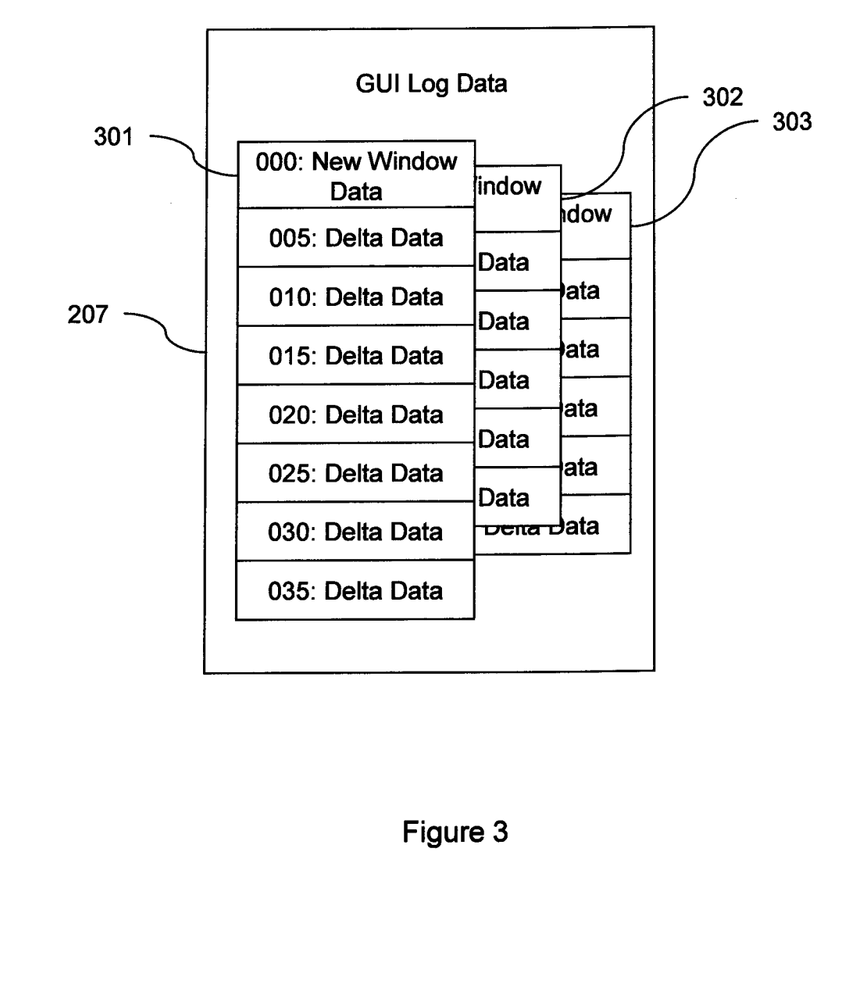
FIG. 3 is a schematic representation of GUI log data logged by the GUI logging application program of FIG. 2.

With reference to FIG. 3, in one embodiment the GUI logging application program 203 is arranged to create a GUI log data file 207 for each application program being monitored. Furthermore, discrete datasets are recorded for each window opened by the monitored application program. In the example of FIG. 3, the GUI log data file 207 includes three datasets 301, 302, 303 indicating that the user application program 201 has opened three windows 113. Each dataset 301, 302, 303 includes a sequence of entries as described above including an initial entry, representing the newly opened window, follow by a series of further entries representing the net change for the relevant logging period resulting from outputs from the monitored application program 201 or user inputs via the keyboard 107 or mouse 109.

The processing performed by the GUI logging application program 203 will now be described further with reference to an example in which the user application 201 opens a new window including a button and a text input field, the user then inputs the text "Hello World" in the text field using the keyboard 107 and then clicks the button using the mouse 109. The initial window has the window handle "747" and results in the following entry in the GUI log data file 207:

Time=10:00:00
Window-com.ibm.gui.window1-opened-windowHandle_747
750_ButtonCreated
750_x=100
750_y=50
750_text=OK
751_TextFieldCreated
751_x=10
751_y=10

The subsequent text input by the user via the keyboard in the next logging period results in the following addition to the entry in the GUI log data file 207:

Time=10:00:05
752_TextInputEventCreatedFor_751
752_data=Hello World
750_ButtonClickedEventCreatedFor_750

In the next logging period the user enters the text "A", then waits 2 seconds and enters "B" and then presses OK and then gets an error message back that says, "The data must be three characters". The user then enters "CDEF" and presses OK and the button's label changes to "Finish". Without data compression this would result in the following entries in the GUI log data file 207:

Time=10:00:10
752_KeyPressEventCreatedFor_751
752_data=A
Time=10:00:12
752_KeyPressEventCreatedFor_751
752_data=B
750_ButtonClickedEventCreatedFor_750
747_Message_display="The data must be three characters"
Time=10:00:13
752_KeyPressEventCreatedFor_751
752_data=CDEF
750_ButtonClickedEventCreatedFor_750
747_Message_display=" "
750_Button_text=Finish Once the above message data is compressed for the logging period only the net change is captured, which is that the text "ABCDEF" was entered and the button's text label changed:

Time=10:00:10 to 10:00:15
752_KeyPressEventCreatedFor_751
752_data=ABCDEF
750_Button_text=Finish Returning to FIG. 2, in one embodiment, the computer 103 is also running a GUI simulation application program 209 arranged to display simulations of GUI interactions of a user and an application program such as the user application program 201. The GUI simulation application program 209 uses the data recorded in the relevant GUI log data file 207 to provide such simulations. In one embodiment, the GUI simulation application program 209 is arranged to display a simulation of the relevant GUI interactions within a GUI interaction replay window. The GUI simulation application program 209 is arranged to input the GUI log data file 207 and to create the lightweight simulation of the corresponding GUI activity captured in the GUI log data file 207. In one embodiment, the GUI simulation application program 209 is further arranged to optionally augment the simulation with additional information from the log file such as logging period data.

Figure 4:
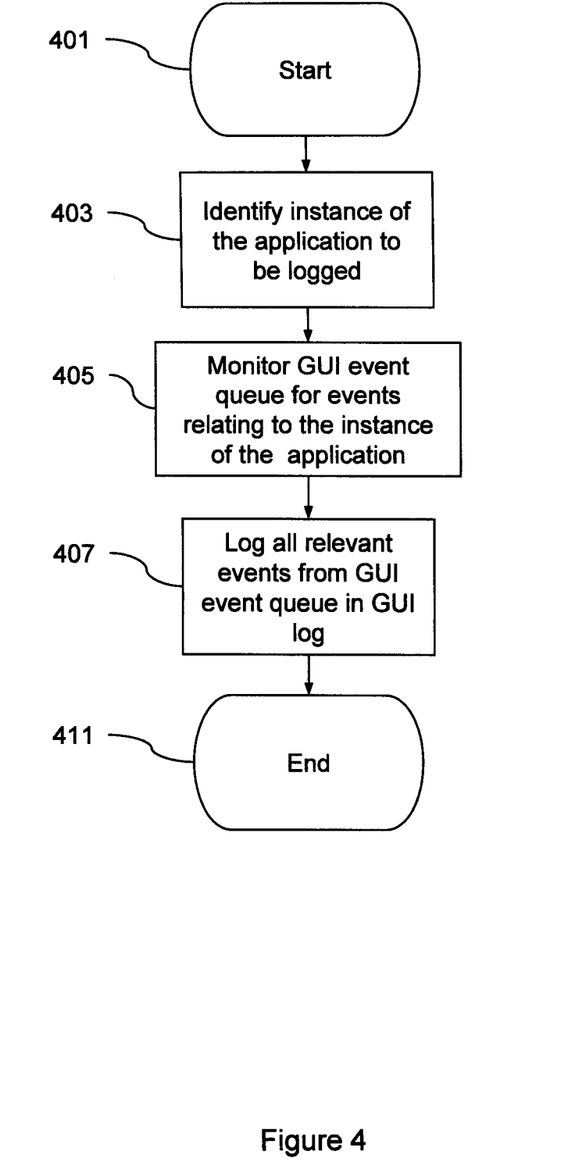
FIG. 4 is a flow chart illustrating the processing performed by the GUI logging application program of FIG. 2 when creating the log of FIG. 3.
Figure 5:
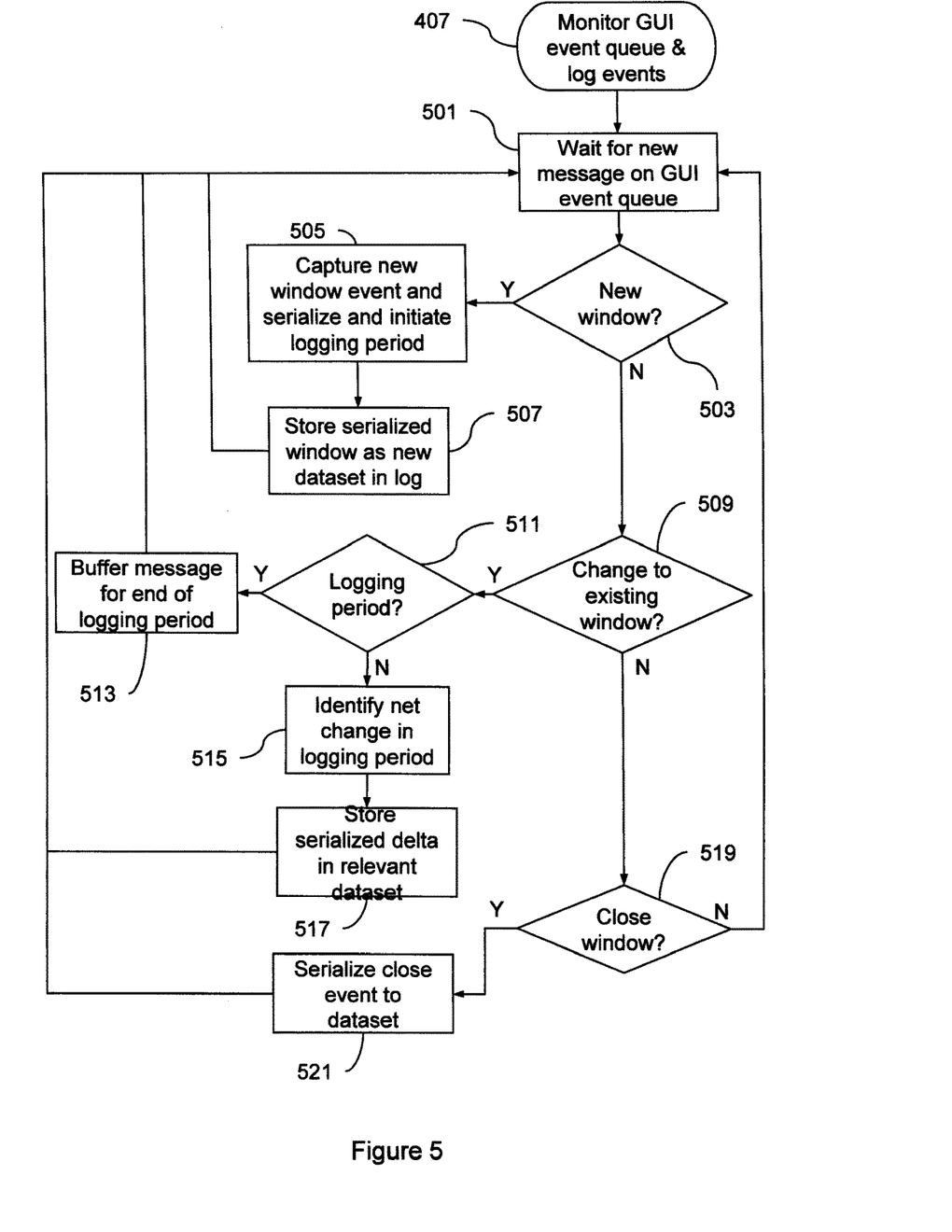
FIG. 5 is a flow chart illustrating further processing performed by the GUI logging application program of FIG. 2 when creating the log of FIG. 3.

The processing performed by the GUI logging application program 203 will now be described further with reference to the flow charts of FIGS. 4 and 5. Processing is initiated at step 401 in response to the startup of the GUI logging application program 203 and processing then moves to step 403. At step 403 the instance of the relevant application program to be monitored is identified and processing moves to step 405. At step 405 monitoring of the GUI event queue 205 is initiated for events relating to the identified instance of the application program 201 being monitored and processing moves to step 407. At step 407 each message relating to the monitored application program 201 that is placed on the GUI event queue is logged in the relevant GUI log data file 207 as described above. See FIG. 5 for further details regarding step 407. This process continues until either the GUI logging application program 203 is stopped or the instance of the application program 201 being monitored ends at which point processing moves to step 411 and ends.

The processing performed by the GUI logging application program 203 in step 407 of the flow chart of FIG. 4 will now be described further with reference to the flow chart of FIG. 5. Processing is initiated from step 407 and moves to step 501 where the GUI event queue 205 is monitored for new messages relating to the user application program 201. When a new message is identified on the GUI event queue 205 processing moves to step 503. At step 503 if the new message relates to the creation of a new window 113 then processing moves to step 505. At step 505 the new window event message is captured and serialized, an associated logging period is initiated and processing moves to step 507. At step 507 the serialized message is stored in the GUI log data file 207 and processing returns to step 501 to await the next relevant message on the GUI event queue 205.

If at step 503 the new message is not related to a new window then processing moves to step 509. If at step 509 the message relates to the updating or modification of an existing window, for example as a result of user input or output from the user application program 201 then processing moves to step 511. At step 511 if the current logging period for the relevant window has yet to expire then processing moves to step 513. At step 513 the new message is buffered to await the end of the current logging period and processing then returns to step 501 to await a further message on the GUI message queue 205.

If however at step 511 the current logging period for the relevant window has expired then processing moves to step 515. At step 515 the net change represented by the current message and any prior messages buffered for the current logging period is determined and processing moves to step 517. At step 517 the data representing the net change is serialized and stored in the relevant dataset 301, 302, 303 for the window 113 in the GUI log file 207 for the relevant logging period and processing returns to step 501 to await a further message on the GUI message queue 205. If at step 509 the new message relates to neither a new window (503) nor a change to an existing window then processing moves to step 519. If at step 519 the new message relates to the closing of a window of one of the monitored windows of the application program 201 then processing moves to step 521. At step 521 the close event is serialized and saved to the relevant dataset 301, 302, 303 for the window and processing returns to step 501 to await a further message on the GUI message queue 205. If at step 519 the new message relates to neither a new window (503) nor a change to an existing window (509) nor the closure of an existing window then processing skips the message and returns to step 501 to await a further message on the GUI message queue 205.

Figure 6:
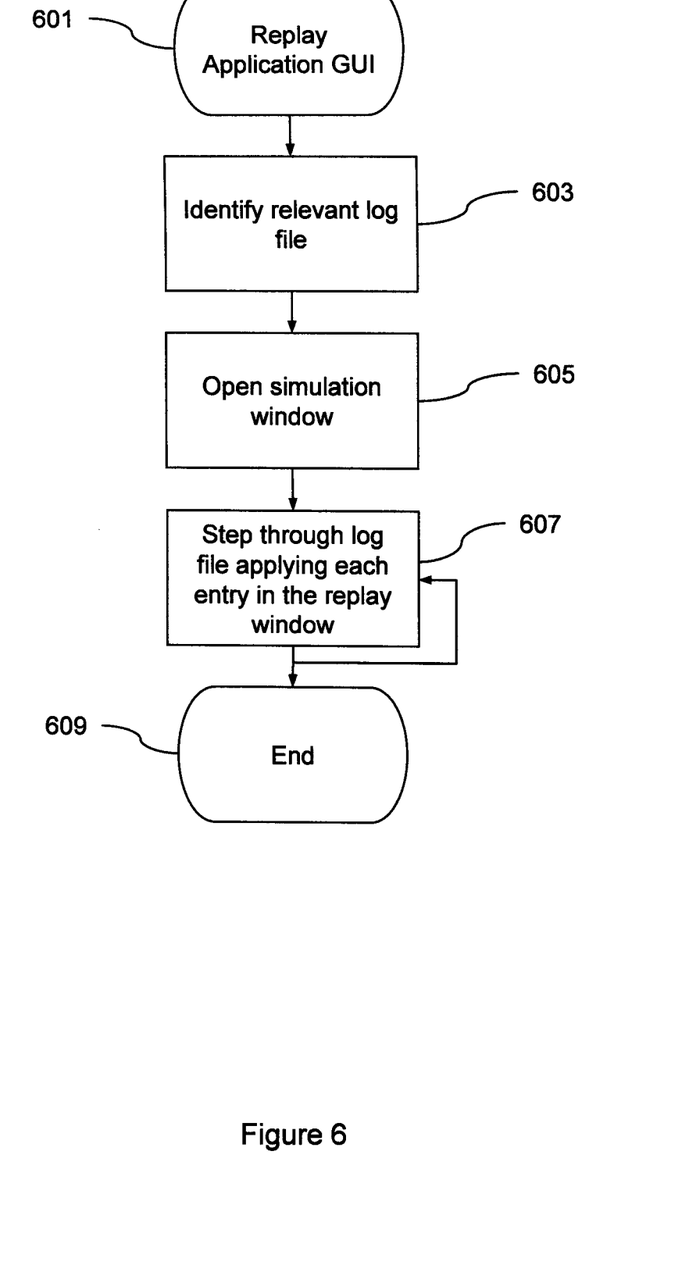
FIG. 6 is a flow chart illustrating the processing performed by the GUI simulation application program of FIG. 2 when simulating the activity of the application program GUI from the data recorded in the log file of FIG. 3.

The processing performed by the GUI simulation application program 209 will now be described further with reference to the flow chart of FIG. 6. Processing is initiated by a user at step 601 and moves to step 603. At step 603 the relevant GUI log data file 207 is identified and processing moves to step 605. At step 605 a new GUI window 113 is opened in which the simulation will be replayed and processing moves to step 607. At step 607 each entry in the GUI log data file 207 is stepped through and the corresponding GUI events are displayed in logging period order in the replay window 113. The simulation can be repeated, paused or reversed under user control or ended in which case processing moves to step 609 and ends.

In a further embodiment, the GUI logging application program is arranged to log the accumulated GUI input in the GUI log file in response to the detection of selected GUI input on the GUI event queue. For example, GUI data logging may be triggered by significant keyboard interactions that are driving the application, such as button clicks or window close and open events. The GUI logging application program may be arranged to wait for a predetermined period triggered by the detection of the selected GUI input before performing the logging. The pause or delay period may be user determined.

In another embodiment, the GUI logging application program is arranged to omit predetermined types of data from the GUI log file. The types of data omitted may be determined by the user or enforced by the GUI logging application program. For example, all data may be omitted or selected sensitive or private data types omitted. Such data may be redacted or removed altogether or replaced with obscured or randomized data.

In a further embodiment, the GUI logging application program is arranged to augment the GUI log file with further timing data or with other application or system data such as memory, task usage or processor resource data. Such additional data may be displayed as appropriate by the GUI simulation program.

In another embodiment the logging period is determined by a quantity of data input or output for the GUI of the monitored application. For example, the number or cumulative size of messages on the monitored event queue of one or more types may determine the logging period for a given window. The logging period may be determined by the amount of data updated to a given window.

In a further embodiment, instead of each window in a given monitored GUI having its own logging period as described above, a global logging period is defined at the end of which the cumulative events for all windows are logged.

Embodiments of the invention provide accurate reconstruction at a predetermined resolution of GUI interactions. This aids swift understanding for an observer of the relevant GUI interactions to enable, for example, the swifter diagnosis of a user's problem. The GUI simulation is easily understood as it mimics the real GUI interaction. The GUI interaction data is collected automatically without user interaction required for its collection. The GUI log data may be collected in real-time so there is no need for a user to reconstruct a given issue. There is no need for program being monitored to be instrumented, have code added, or be rewritten. Embodiments of the invention provide passive logging of GUI interactions during the normal operation of the monitored program. The GUI log file data can be read manually or replayed as a simulation. The data contained in the log file can be tailored or controlled depending on a given application of the embodiment. The GUI log file is relatively compact for efficient communication or storage.

As will be understood by those skilled in the art, the serialization method used for creating data for the GUI log depends on the GUI toolkit used for a given system. For example if the GUI toolkit makes use of the JavaBeans™ Encoder then the GUI data may be serialized in XML (eXtensible Markup Language; Java and all Java-based trademarks and logos are trademarks or registered trademarks of Oracle and/or its affiliates).

As will be understood by those skilled in the art, any suitable event queue may be used to monitor the GUI output or input for a program of interest. For example, a general event queue may be monitored, for example, provided by an OS or a specific event queue of the OS or application may be monitored. Furthermore, more than one event queue may be monitored and the relevant messages identified and logged.

As will be understood by those skilled in the art, any input or output in addition to GUI input or output for a program may be monitored and logged as appropriate. Other selected input or output determined as relevant to the program being monitored may be logged such as input or output from the OS or other program.

As will be understood by those skilled in the art, not all input or output data of an application program being monitored need be logged. For example, only GUI activity output by the application may be logged and any user GUI input such as keyboard or mouse input omitted.

As will be understood by those skilled in the art, while the system is described above in relation to a single computer, the functions of the system may divided as appropriate into a client and server architecture. In addition, the GUI logging application program and the GUI simulation application program may be run on separate computers with the relevant GUI log files being communicated from one to the other by any suitable means such as over a network.

As will be understood by those skilled in the art, the GUI user input may be provided by any suitable input device including virtual or soft devices such as soft-keyboards.

As will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), compact disc read/write (CD-R/W) or DVD disc, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (Java and all Java-based trademarks and logos are trademarks or registered trademarks of Oracle and/or its affiliates; other marks may be trademarks or registered trademarks of their respective owners). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, a preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, a preferred embodiment of the present invention may be realized in the form of a data carrier having functional data thereon, said functional data comprising functional computer data structures to, when loaded into a computer system and operated upon thereby, enable said computer system to perform all the steps of the method.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the present invention.

The invention claimed is:

1. An apparatus for recording graphical user interface (GUI) data for a computer program, the apparatus comprising one or more processors arranged to:
    monitor an operating system event queue associated with a GUI for a program;
    identify a first message on the operating system event queue defining a window of the GUI for the program;
    log data representing the window in a log associated with the program, wherein the log is used to display a recorded GUI activity as a simulation of the program, and wherein the logging of the data is triggered in accordance with a predetermined logging period associated with time, message data content, or message data quantity;
    identify one or more further messages on the operating system event queue defining one or more updates to the window;

identify a net change to the window defined in the further messages; and log data representing the identified net change to the window in the log.

2. The apparatus according to claim 1 wherein the data representing the window comprises a serialization of the window.

3. The apparatus according to claim 1 wherein the data representing the net change to the window comprises a serialization of one or more changes to the window.

4. The apparatus according to claim 1 wherein the data representing the window and the data representing the net change to the window are derived from their respective identified messages on the operating system event queue.

5. The apparatus according to claim 1 wherein one or more messages on the operating system event queue define user input to the window of the GUI for the program.

6. The apparatus according to claim 1 wherein one or more predetermined sets of data are omitted from the log.

7. The apparatus according to claim 1 wherein the logged data comprises XML.

8. The apparatus according to claim 1 further operable to:
identify a log file for a selected application program; and
display the recorded GUI activity from the log file entries as a simulation of the selected application program GUI.

9. A method for recording graphical user interface (GUI) data for a computer program, the method comprising the steps of:

monitoring an operating system event queue associated with a GUI for a program;

identifying a first message on the operating system event queue defining a window of the GUI for the program;

logging data representing the window in a log associated with the program, wherein the log is used to display a recorded GUI activity as a simulation of the program, and wherein the logging of the data is triggered in accordance with a predetermined logging period associated with time, message data content, or message data quantity;

identifying one or more further messages on the operating system event queue defining one or more updates to the window;

identifying a net change to the window defined in the further messages; and logging data representing the identified net change to the window in the log.

10. The method according to claim 9 wherein the data representing the window comprises a serialization of the window.

11. The method according to claim 9 wherein the data representing the net change to the window comprises a serialization of one or more changes to the window.

12. The method according to claim 9 wherein the data representing the window and the data representing the net change to the window are derived from their respective identified messages on the operating system event queue.

13. The method according to claim 9 wherein one or more messages on the operating system event queue define user input to the window of the GUI for the program.

14. The method according to claim 9 wherein one or more predetermined sets of data are omitted from the log.

15. The method according claim 9 wherein the logged data comprises XML.

16. The method according to claim 9 further comprising the steps of:

identifying a log file for a selected application program; and displaying the recorded GUI activity from the log file entries as a simulation of the selected application program GUI.

17. A computer program product for recording GUI data for a computer program, the computer program product comprising a computer-readable storage medium having computer-readable program code embodied therewith, the computer-readable program code configured to:

monitor an operating system event queue associated with a GUI for a program;

identify a first message on the operating system event queue defining a window of the GUI for the program;

log data representing the window in a log associated with the program, wherein the log is used to display a recorded GUI activity as a simulation of the program, and wherein the logging of the data is triggered in accordance with a predetermined logging period associated with time, message data content, or message data quantity;

identify one or more further messages on the operating system event queue defining one or more updates to the window;

identify a net change to the window defined in the further messages; and log data representing the identified net change to the window in the log.

18. The computer program product according to claim 17 wherein the data representing the window comprises a serialization of the window.

19. The computer program product according to claim 17 wherein the data representing the net change to the window comprises a serialization of one or more changes to the window.

20. The computer program product according to claim 17 wherein the data representing the window and the data representing the net change to the window are derived from their respective identified messages on the operating system event queue.

21. The computer program product according to claim 17 wherein one or more messages on the operating system event queue define user input to the window of the GUI for the program.

* * * * *